(12) United States Patent
McCoy et al.

(10) Patent No.: US 6,467,792 B2
(45) Date of Patent: Oct. 22, 2002

(54) TRAILER HITCH ASSEMBLY WITH INTEGRAL TOW HOOKS

(75) Inventors: Richard W. McCoy, Granger, IN (US); Thomas W. Lindenman, South Bend, IN (US)

(73) Assignee: Reese Products, Inc., Elkhart, IN (US)

( * ) Notice: Subject to any disclaimer, the term of this patent is extended or adjusted under 35 U.S.C. 154(b) by 0 days.

(21) Appl. No.: 09/812,375

(22) Filed: Mar. 20, 2001

(65) Prior Publication Data

US 2001/0035627 A1 Nov. 1, 2001

Related U.S. Application Data

(60) Provisional application No. 60/194,501, filed on Apr. 3, 2000.

(51) Int. Cl.[7] .................................................. B60D 1/48
(52) U.S. Cl. ........................................ 280/495; 280/457
(58) Field of Search ................................. 280/495, 457, 280/458, 480, 480.1, 500, 502

(56) References Cited

U.S. PATENT DOCUMENTS

| | | | |
|---|---|---|---|
| 1,145,722 A | * 7/1915 | Walles | ...................... 24/129 R |
| 3,436,100 A | * 4/1969 | Abromavage et al. | ...... 280/502 |
| 3,549,173 A | 12/1970 | Stanfield | |
| 3,768,837 A | 10/1973 | Rees | |
| 3,774,952 A | * 11/1973 | Zorn | ........................ 280/164.1 |
| 3,870,343 A | 3/1975 | McGahee | |
| 4,558,880 A | 12/1985 | Nangle et al. | |
| 4,607,858 A | 8/1986 | Wagner | |
| 4,738,464 A | 4/1988 | Putnam | |
| 4,946,185 A | 8/1990 | Likei | |
| 5,620,198 A | 4/1997 | Borchers | |
| 5,732,967 A | 3/1998 | Behling | |
| 5,738,363 A | 4/1998 | Larkin | |
| 5,788,258 A | 8/1998 | Gill et al. | |
| 5,918,896 A | 7/1999 | Jenkins, Jr. | |
| 5,971,418 A | 10/1999 | Lindenman et al. | |
| 6,045,147 A | 4/2000 | Schmidt et al. | |
| 6,139,042 A | * 10/2000 | Tetrick | ..................... 280/490.1 |
| 6,139,044 A | * 10/2000 | Smith et al. | ................. 280/500 |

* cited by examiner

*Primary Examiner*—Kevin Hurley
(74) *Attorney, Agent, or Firm*—King & Schickli, PLLC

(57) ABSTRACT

A trailer hitch assembly for towing a trailer behind a towing vehicle includes a frame member including a hitch receiver box, a mounting bracket carried on each end of the frame member and a tow hook integrally formed in each of said mounting brackets.

7 Claims, 2 Drawing Sheets

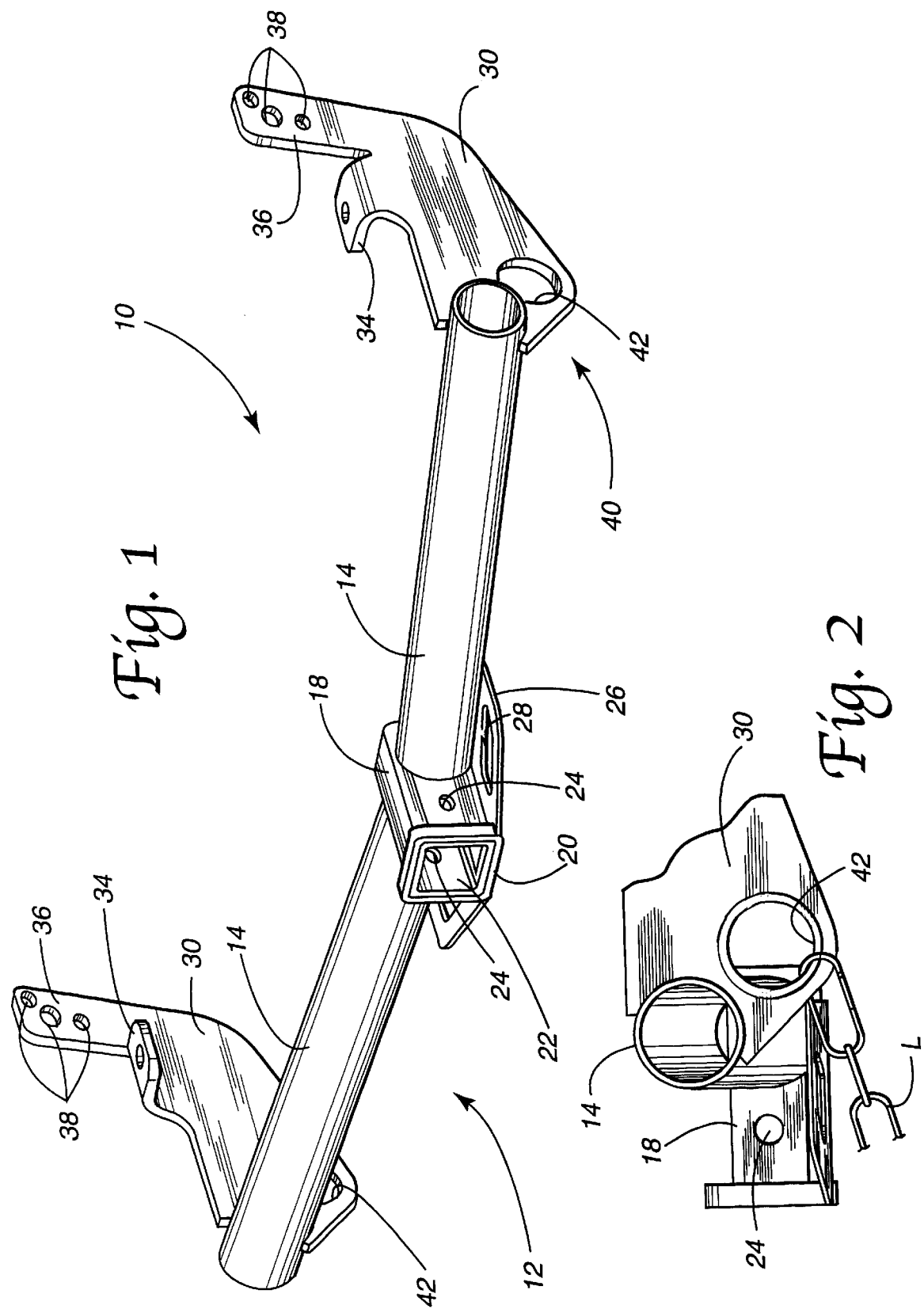

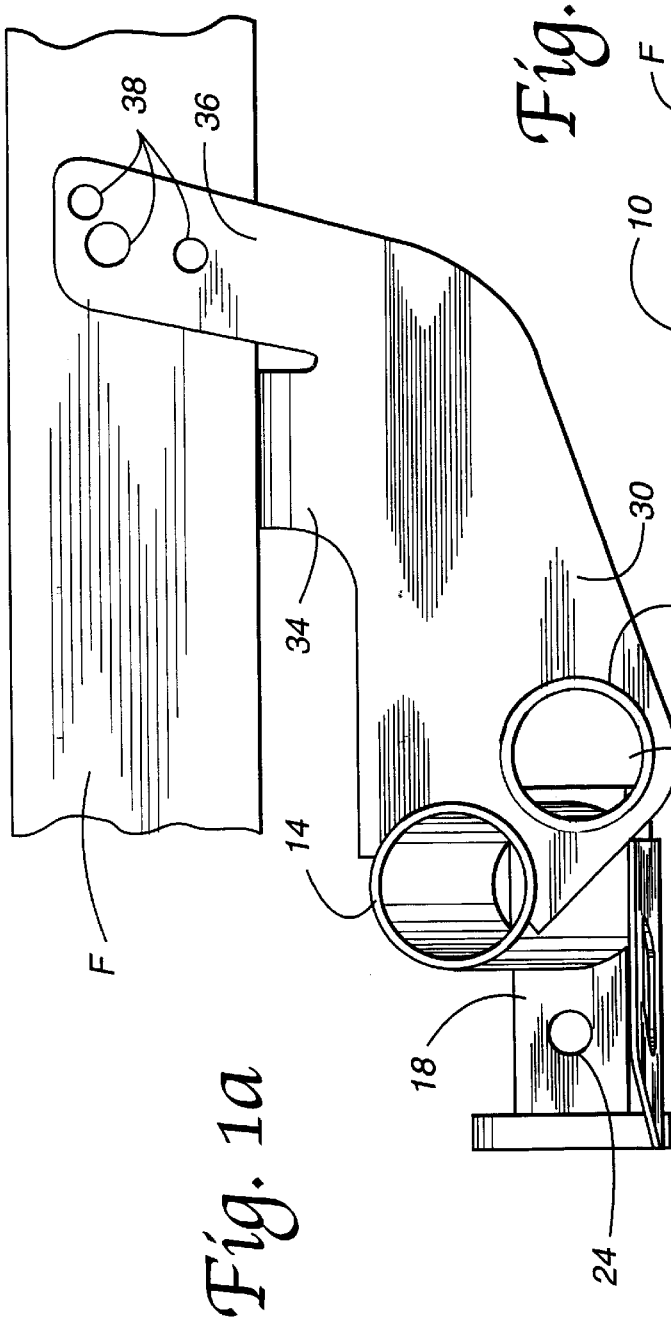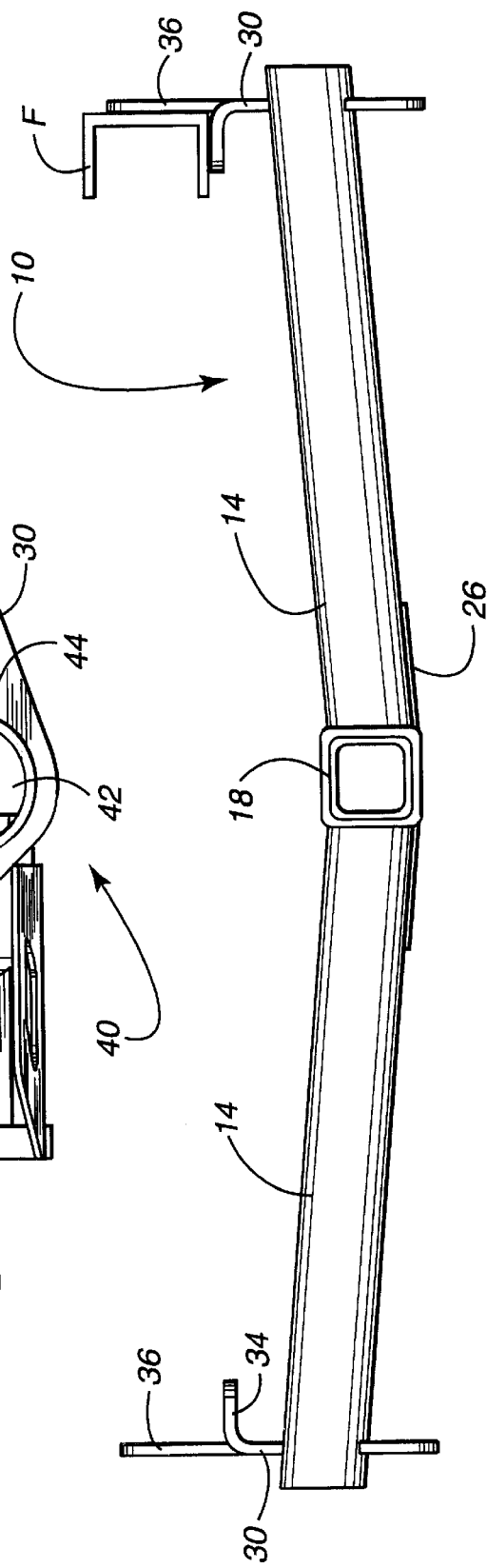

TRAILER HITCH ASSEMBLY WITH INTEGRAL TOW HOOKS

This application claims the benefit of U.S. Provisional Application No. 60/194,501 filed Apr. 3, 2000.

TECHNICAL FIELD

The present invention relates generally to trailer hitch assemblies and, more particularly, to a trailer hitch assembly incorporating integral tow hooks for receiving and holding chains, cables or the like and, therefore, useful in various towing applications.

BACKGROUND OF THE INVENTION

It has long been known to construct trailer hitch assemblies that are mounted to vehicles in order to allow the towing of trailers or the like. In recent years, such hitch assemblies have been designed to include a receiver box having a rearwardly directed opening or cavity for the receipt of a hitch or draw bar that carries a hitch ball or other means allowing connection to a trailer. Examples of such a structure include U.S. Pat. No. 3,768,837 to Reese and U.S. Pat. No. 5,620,198 to Borchers, both owned by Reese Products, Inc., the Assignee of the present invention.

While a hitch ball is useful for most towing applications and particularly those involving a trailer equipped with a cooperating socket, certain situations may arise where a hitch ball is inappropriate and ill-suited for the task. Such a situation may arise when, for example, it is necessary to pull a trailer or another vehicle that has become stuck in mud. In such an instance, it is desirable to make the connection between the towing vehicle and the trailer or vehicle being towed with a long tow line. Such a tow line allows the towing vehicle to be operated on a roadway or other surface where sufficient traction is available to allow the stuck vehicle or trailer to be freed from the mud.

SUMMARY OF THE INVENTION

Advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing, and in accordance with the purposes of the present invention as described herein, an improved trailer hitch assembly is provided. The trailer hitch assembly includes a frame member, at least one mounting bracket carried on the frame member for securing the frame member to the vehicle, a hitch receiver box carried on the frame member and a tow hook integrally formed in the mounting bracket. Preferably, the tow hook includes an aperture formed in the mounting bracket. Thus, a tow line may be quickly and conveniently connected to the mounting bracket by passing a hook through the aperture so as to engage the margin of the mounting bracket around the aperture. It is also possible to loop the line around the mounting bracket by passing the line through the aperture. Either way provides a secure connection for towing.

In accordance with a further aspect of the present invention, a method is provided for towing an object behind a vehicle equipped with a hitch assembly where that hitch assembly includes a mounting bracket for securing the hitch assembly to the towing vehicle. The method includes the steps of forming an aperture in the mounting bracket, securing a tow line to the mounting bracket by connection at the aperture, securing the tow line to the object and pulling the object with the towing vehicle.

Advantageously, the present invention provides a simple and inexpensive means of connection to tow an object with a tow vehicle using a simple tow line. Further, since the tow line connection point is the hitch assembly mounting bracket and the mounting bracket is secured in alignment with the frame of the towing vehicle, an optimal towing geometry is provided. Consequently, twisting and shear forces exerted on the frame are minimized during towing.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION Of THE DRAWING

The accompanying drawing incorporated in and forming a part of the specification, illustrates several aspects of the present invention and together with the description serves to explain the principles of the invention. In the drawing:

FIG. 1 is a perspective view of the trailer hitch assembly of the present invention;

FIG. 1a is a right side elevational view of the trailer hitch assembly of FIG. 1;

FIG. 1b is a rear elevational view of the trailer hitch assembly of FIGS. 1 and 1a; and FIG. 2 is a right side elevational view showing the connection of a tow line to the tow hook integrally formed in the mounting bracket of the trailer hitch assembly.

Reference will now be made in detail to the present preferred embodiment of the invention, an example of which is illustrated in the accompanying drawing.

DETAILED DESCRIPTION OF THE INVENTION

Reference is now made to FIGS. 1, 1a and 1b showing a trailer hitch assembly 10 of the present invention. The trailer hitch assembly 10 includes a frame member or cross member 12 preferably formed from a pair of tubular steel sections 14 welded to the side walls 16 of a centrally located receiver box 18 so as to project outwardly in substantially opposing directions. The tubular steel sections 14 may be formed with a round cross section as shown in the drawing figures, an elliptical cross section, a square cross section or any other appropriate shape providing the necessary strength to function as a trailer hitch assembly 10. Further, while a two piece cross member 12 is illustrated, it should be appreciated that the cross member 12 could be of another design such as a single continuous piece with the receiver box 18 welded beneath the cross member, above the cross member, behind the cross member of in the cross member.

The receiver box 18 includes a reinforced lip 20 defining an opening leading to a hitch bar receiving cavity 22. Aligned apertures 24 in the opposing side walls 16 of the receiver box 18 allow the secure connection of a hitch bar in the receiver box in a manner well known in the art by means of a connecting pin and cooperating pin clip (not shown). A chain plate 26 of steel material is welded to the receiver box 18 and tubular steel sections 14 in order to strengthen the connection. As is know in the art, chain plate 26 includes two apertures 28. The safety chains of a trailer may be connected to the chain plate 26 through engagement in these apertures 28.

Vehicle mounting brackets 30 formed from 0.25–0.375 inch thick steel plates are mounted adjacent the distal end of each tubular section 12. More specifically, each mounting bracket 30 includes a notch 32 sized and shaped to receive the tubular section 14. The brackets 30 are welded to the tubular sections 14 in order to complete the connection. The mounting brackets 30 each include a mounting flange 34 and an upwardly projecting mounting lug 36, both with apertures 38. Nut and bolt fasteners (not shown) are extended through these apertures 38 and cooperating apertures drilled in the frame F of the towing vehicle in order to mount the trailer hitch assembly 10 thereto.

Of course, the arrangement of the mounting flange 32 and/or mounting lug 34 will vary from hitch assembly to hitch assembly in order to correspond to the frame of the vehicle to which the hitch assembly is to be mounted. As such, the arrangement and orientation of the flanges 32 and lugs 34 in the drawing figures are to be considered illustrative in nature and not as restrictive.

As also shown in FIG. 1, the trailer hitch assembly 10 incorporates a pair of tow hooks or loops 40 integrally formed in each mounting bracket 30. The tow hooks 40 may be engaged with a tow line such as a rope, chain or cable in order to complete certain towing applications. As best shown in FIG. 1a, each tow hook 40 (only one shown in the figure) includes an aperture 42 formed in a slightly downwardly projecting section of the mounting bracket 30. The margin 44 of the mounting bracket 30 surrounding the aperture 42 may be reinforced to provide extra strength.

In use, a tow line L of chain, cable or the like is tied to, looped through, hooked on or otherwise connected to the mounting bracket 30 by passing through the aperture 42 (see FIG. 2). Connection is simplified since the aperture 42 is in a section of the mounting bracket 30 which projects downwardly below the cross section 12 so as to be more accessible. The other end of the tow line is secured to the object it is desired to tow. The tow vehicle is then very gradually driven forward to remove any slack from the tow line. Once all the slack is removed, power is increased until the object is pulled forward by the towing vehicle.

It should be appreciated that the mounting bracket 30 is secured to the towing vehicle in longitudinal alignment with the vehicle frame F. Since the tow hook 40 is formed by a simple aperture 42 in the bracket 30, the tow line is connected at a point in alignment with the vehicle frame. As a result, torque and shear forces exerted upon the vehicle frame during the towing operation are advantageously minimized at all times.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A trailer hitch assembly for towing a trailer behind a towing vehicle, comprising:

a frame member including a hitch receiver box;

at least one mounting bracket carried on said frame member for securing said frame member to the vehicle; and a tow hook aperture formed in said at least one mounting bracket wherein a margin of said at least one mounting bracket around said aperture is reinforced.

2. The trailer hitch assembly of claim 1, wherein said at least one mounting bracket includes a downwardly projecting section in which said aperture is formed.

3. A trailer hitch assembly for towing a trailer behind a towing vehicle, comprising:

a frame member including a hitch receiver box;

a mounting bracket carried on each end of said frame member;

a tow hook aperture formed in at least one of said mounting brackets wherein a margin of said at least one of said mounting brackets around said aperture is reinforced.

4. The trailer hitch assembly of claim 3, wherein said at least one of said mounting brackets includes a downwardly projecting section in which said aperture is formed.

5. A trailer hitch assembly for towing a trailer behind a towing vehicle, comprising:

a frame member including a hitch receiver box;

a mounting bracket carried on each end of said frame member;

a tow hook aperture formed in each of said mounting brackets wherein a margin of said mounting brackets around each said aperture is reinforced.

6. The trailer hitch assembly of claim 5, wherein said mounting brackets each include a downwardly projecting section in which one of said tow hook apertures is formed.

7. A method of towing an object behind a towing vehicle equipped with a hitch assembly including a mounting bracket for securing the hitch assembly to the towing vehicle, comprising:

forming a reinforced aperture in the mounting bracket;

securing a tow line to the mounting bracket by connection at said reinforced aperture;

securing the tow line to the object; and pulling the object with the towing vehicle.

* * * * *